(12) United States Patent
Hu et al.

(10) Patent No.: US 7,676,069 B2
(45) Date of Patent: *Mar. 9, 2010

(54) METHOD AND APPARATUS FOR ROLLING ENROLLMENT FOR SIGNATURE VERIFICATION

(75) Inventors: Jianying Hu, Bronx, NY (US); Gregory Fraser Russell, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/125,396

(22) Filed: May 22, 2008

(65) Prior Publication Data

US 2008/0219519 A1 Sep. 11, 2008

Related U.S. Application Data

(63) Continuation of application No. 11/343,689, filed on Jan. 31, 2006.

(51) Int. Cl.
*G06K 9/00* (2006.01)
*G06F 7/04* (2006.01)
(52) U.S. Cl. .................. 382/119; 340/5.52; 340/5.53; 340/5.82; 340/5.83
(58) Field of Classification Search ......... 382/115–127, 382/155–161; 706/1–44; 340/5.52–5.55, 340/5.8–5.86; 704/231–257, 273–275
See application file for complete search history.

(56) References Cited

U.S. PATENT DOCUMENTS 4,724,542 A * 2/1988 Williford .................... 382/119

(Continued)

FOREIGN PATENT DOCUMENTS

WO PCT/US2006/060101 10/2006

OTHER PUBLICATIONS

"Supervised Adaption for Signature Verification System." IBM Technical Disclosure Bulletin. (Jun. 1978) vol. 21 No. 1, pp. 424-425.*

(Continued)

*Primary Examiner*—Bhavesh M Mehta
*Assistant Examiner*—Barry Drennan
(74) *Attorney, Agent, or Firm*—Daniel P. Morris; Ryan, Mason & Lewis, LLP

(57) ABSTRACT

Improved techniques are disclosed for adapting signature verification systems to natural signature variations. For example, a technique for adapting a signature verification system to variations in a signature of a user includes the following steps/operations. One or more signature samples are obtained from the user. The one or more obtained signature samples are submitted by the user as part of a regular authentication procedure associated with the signature verification system. A reference set of signature samples for the user is updated through selection of one or more signature samples from the obtained signature samples, such that the updated reference set is usable by the signature verification system for verifying subsequent signature samples attributed to the user. The selection of the one or more signature samples used to update the reference set is conditioned on a false rejection rate of the user when at least one obtained signature sample of the user is authenticated and on an identification check when no obtained signature sample is authenticated.

17 Claims, 2 Drawing Sheets

U.S. PATENT DOCUMENTS

| | | | | |
|---|---|---|---|---|
| 5,553,156 | A | * | 9/1996 | Obata et al. .................. 382/119 |
| 5,559,895 | A | * | 9/1996 | Lee et al. .................... 382/119 |
| 5,761,330 | A | * | 6/1998 | Stoianov et al. ............. 382/127 |
| 5,802,200 | A | * | 9/1998 | Wirtz .......................... 382/119 |
| 5,999,637 | A | * | 12/1999 | Toyoda et al. ............... 382/124 |
| 6,424,728 | B1 | | 7/2002 | Ammar |
| 6,430,305 | B1 | * | 8/2002 | Decker ....................... 382/116 |
| 6,591,224 | B1 | * | 7/2003 | Sullivan et al. ............. 702/179 |
| 6,655,585 | B2 | * | 12/2003 | Shinn ......................... 235/382 |
| 6,826,306 | B1 | * | 11/2004 | Lewis et al. ................. 382/187 |
| 2005/0223234 | A1 | | 10/2005 | McOwan et al. |
| 2006/0093190 | A1 | * | 5/2006 | Cheng et al. ................ 382/115 |
| 2008/0037832 | A1 | * | 2/2008 | Phoha ........................ 382/115 |

OTHER PUBLICATIONS

G.F. Russell et al., entitled "Dynamic Signature Verification Using Discriminative Training," Proceedings of the 8th International Conference on Document Analysis and Recognition (ICDAR2005), Seoul, Korea, 5 pages, Aug. 2005.

A. Kholmatov et al., entitled "Biometric Authentication Using Online Signatures," In Lecture Notes in Computer Science—ISCIS, 8 pages, Oct. 2004.

P.T. Devanbu et al., "Cryptographic Verification of Test Coverage Claims," in IEEE Transactions on Software Engineering, Feb. 1999, pp. 178-192, vol. 26, No. 2.

* cited by examiner

METHOD AND APPARATUS FOR ROLLING ENROLLMENT FOR SIGNATURE VERIFICATION

CROSS-REFERENCE TO RELATED APPLICATION(S)

This application is a continuation of pending U.S. application Ser. No. 11/343,689 filed on Jan. 31, 2006, the disclosure of which is incorporated herein by reference.

FIELD OF THE INVENTION

This present invention generally relates to signature verification systems and, more particularly, to improved techniques for adapting such systems to natural signature variations.

BACKGROUND OF THE INVENTION

Signature verification is a commonly used biometric authentication method. Compared with other forms of biometric authentication such as fingerprint or iris verification, signature verification has the advantage that it is a historically well-established and well-accepted approbation method and is thus perceived to be less intrusive than modern alternatives. This property makes it particularly attractive to applications in banking, retail and hospitality industries.

Signature verification is divided into two main areas: static (offline) signature verification where signature samples are optically scanned into image representations, and dynamic (online) signature verification where signature samples are collected from a digitizing tablet capable of recording pen movements during writing.

In general, the process of signature verification involves comparing a new signature submitted for testing to a set of previously collected reference signatures to determine whether the new signature is authentic. Having a set of references that captures the natural variation among different authentic signatures of the same subject is crucial for a verification system to operate effectively.

In existing systems, a number of signature samples (typically five to ten) are collected in one enrollment session and used as reference samples. However, there are a number of drawbacks with this scheme.

First, in some applications such as retail, collecting many samples during one enrollment session puts an undue burden on customers. Ideally, the number of signature samples collected during initial enrollment should be limited to no more than three.

Second, even if more samples can be collected during enrollment, samples collected in one session are typically not very representative of the natural variation exhibited by most signers. Often, a larger degree of variation is observed on samples collected from different sessions with long breaks (i.e., days) in between. Furthermore, it is known that samples collected in one session can not capture the "drift" (i.e., a slow shifting of style over a period of time) which is also common among signers.

One known solution to these problems is to first collect the reference samples over several enrollment sessions to capture the current range of variation, then have periodic "re-enrollment" sessions (e.g., once a year) to capture the signature drift. However, this is not very practical because of the extra burden placed on the customers.

Another known solution is to add to the reference set, at a time during or after the regular authentication (e.g., sign-in verification) process, any signature sample that produced a high enough score during verification. However, this policy is not very effective since setting the threshold too high will only allow the addition of samples that are very close to the initial reference samples, thus defeating the purpose of capturing more variation; while setting it too low will increase the risk of adding forgeries, thus polluting the reference set.

SUMMARY OF THE INVENTION

Principles of the present invention are directed toward improved techniques for adapting signature verification systems to natural signature variations.

In one aspect of the invention, a technique for adapting a signature verification system to variations in a signature of a user comprises the following steps/operations. One or more signature samples are obtained from the user. The one or more obtained signature samples are submitted by the user as part of a regular authentication procedure associated with the signature verification system. A reference set of signature samples for the user is updated through selection of one or more signature samples from the obtained signature samples, such that the updated reference set is usable by the signature verification system for verifying subsequent signature samples attributed to the user. The selection of the one or more signature samples used to update the reference set is conditioned on a false rejection rate of the user when at least one obtained signature sample of the user is authenticated and on an identification check when no obtained signature sample is authenticated.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular processing system architecture. The invention is instead more generally applicable to any processing system in which it would be desirable to improve the ability of a signature verification system to adapt to natural signature variations.

As will be illustratively explained herein, the present invention provides a process to improve the performance of a signature verification system and enable the system to adapt to natural signature variations by dynamically supplementing and updating subject reference samples in a non-intrusive manner through the selection of representative samples collected during regular authentication sessions. That is, the invention provides a technique for updating the reference set in a non-intrusive manner, without extra effort on the part of the users, while at the same time selecting only the samples that are most likely to be representative.

Such an inventive technique, referred to herein as "rolling enrollment," enables a signature verification system to dynamically supplement and update the initial reference set in a non-intrusive manner using samples that are collected during normal signature verification sessions. That is, in accordance with the invention, enrollment is passive in that it is performed, in the background, while the user is normally signing in to perform some transaction (e.g., retail or banking transaction), rather than via a separate, active enrollment process. However, it is to be understood that the techniques of the invention can also be utilized after an initial active enrollment process, wherein an initial reference set of signature samples is collected. The inventive process selects and updates the reference set, possibly each time the user regularly employs the system.

Unlike existing schemes, verification policies of the invention add signature samples that do not produce a very high score during verification, thus more effectively capturing the signer variation. At the same time, the administration of these policies is fine tuned for each individual account based on its current false rejection (FR) rate to reduce the probability of reference set contamination through the addition of forgeries. False rejection is typically the situation wherein the signature verification system fails to verify the true owner of a signature based on that signature, while false acceptance (FA) is typically the situation wherein the system verifies an imposter based on a false or forged signature.

Figure 1:
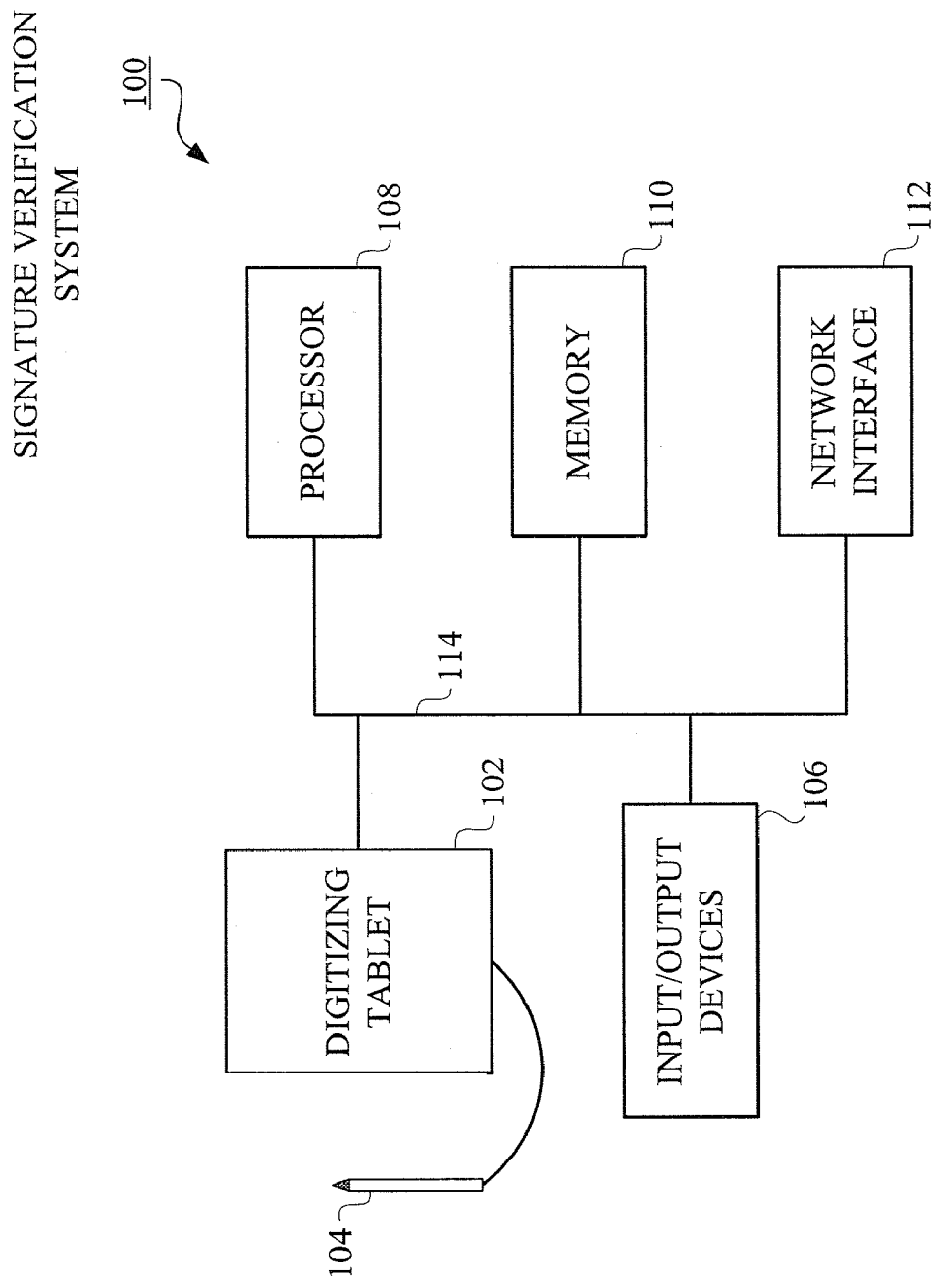
FIG. 1 is a block diagram illustrating a signature verification system, according to an embodiment of the invention.

Before illustratively describing specific steps of the inventive technique, an overview of a signature verification system is given in the context of FIG. 1.

As shown in FIG. 1, signature verification system 100 includes a digitizing tablet 102 with stylus (pen) 104, input/output devices 106, processor 108, memory 110, and network interface 112, each coupled to a communication bus 114.

In general, a user (e.g., a customer in a retail application) signs his or her name on digitizing tablet 102 using stylus 104. As is well known, the digitizing tablet is capable of recording stylus movements during writing. The signature, typically along with an identifier (ID) of the user (e.g., personal identification number (PIN), phone number, or date of birth), are used to verify the user's identity, such that some transaction can be performed or completed. The particular transaction depends on the particular application (e.g., a retail transaction, a banking transaction, etc.).

Input/output devices 106, processor 108, and memory 110 are used to perform the signature verification, and possibly a part of or the entire application-specific transaction. For example, input/output devices 106 may include a visual display (an example of an output device) that prompts the user to enter his or her signature (e.g., for the transaction or for enrollment), and that gives the user other information or feedback regarding verification or the transaction. Input/output devices 106 may also include a keypad or keyboard that permits the user to enter information such as a user ID. Of course, as is known, the digitizing tablet may have the ability to provide visual feedback and ID entry to the user, rather than use of separate devices.

As is known, processor 108 and memory 110 perform the computations necessary to accomplish signature verification, and even the transaction. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Network interface 112 may include, for example, one or more devices capable of allowing the signature verification system 110 to communicate with other computing systems. Thus, the network interface may comprise a transceiver configured to communicate with a transceiver of another computer system via a suitable communications protocol. It is to be understood that the invention is not limited to any particular communications protocol. That is, it is possible that system 100 operates with one or more other computing systems to perform signature verification and a transaction. For example, signature verification alone could be performed by system 100, results of which are provided to an application server coupled to system 100 via network interface 112, which performs the transaction.

It is also to be appreciated that communication bus 114 does not have to be a local bus, but rather can itself represent a network connection wherein one or more components of signature verification system 100 are located remote from one or more other components.

Accordingly, FIG. 1 represents a computing system wherein one or more computer programs, or software components thereof, including instructions or code for performing methodologies described herein, may be stored in one or more of the associated storage media (e.g., ROM, fixed or removable storage) and, when ready to be utilized, loaded in whole or in part (e.g., into RAM) and executed by the processor 108.

In any case, it is to be appreciated that methodologies described herein may be implemented in various forms of hardware, software, or combinations thereof, e.g., one or more operatively programmed general purpose digital computers with associated memory, implementation-specific integrated circuit(s), functional circuitry, etc.

Furthermore, as mentioned above, a function also performed by system 100 is enrollment. In accordance with the invention, system 100 performs rolling enrollment, as described below in the context of FIG. 2. Rolling enrollment enables signature verification system 100 to dynamically supplement and update an initial reference set used to verify a user in a non-intrusive manner using samples that are collected during normal signature verification sessions, i.e., during the regular sign-on process.

The regular authentication process proceeds as follows. Each submitted sample is compared to reference signatures (or a model or template derived from these reference signatures) for this user stored in the system (called an account) and a score is produced indicating how well the new sample matches the reference samples stored in the system. If the score is higher than a pre-selected threshold, Tr, then authentication succeeds. Otherwise, the user is invited to submit another sample, which is checked against the reference samples again. This process continues until the maximum number of trials has been exceeded. At this point, the user is subjected to an ID check and accepted if he/she passes the ID check, rejected otherwise.

Figure 2:
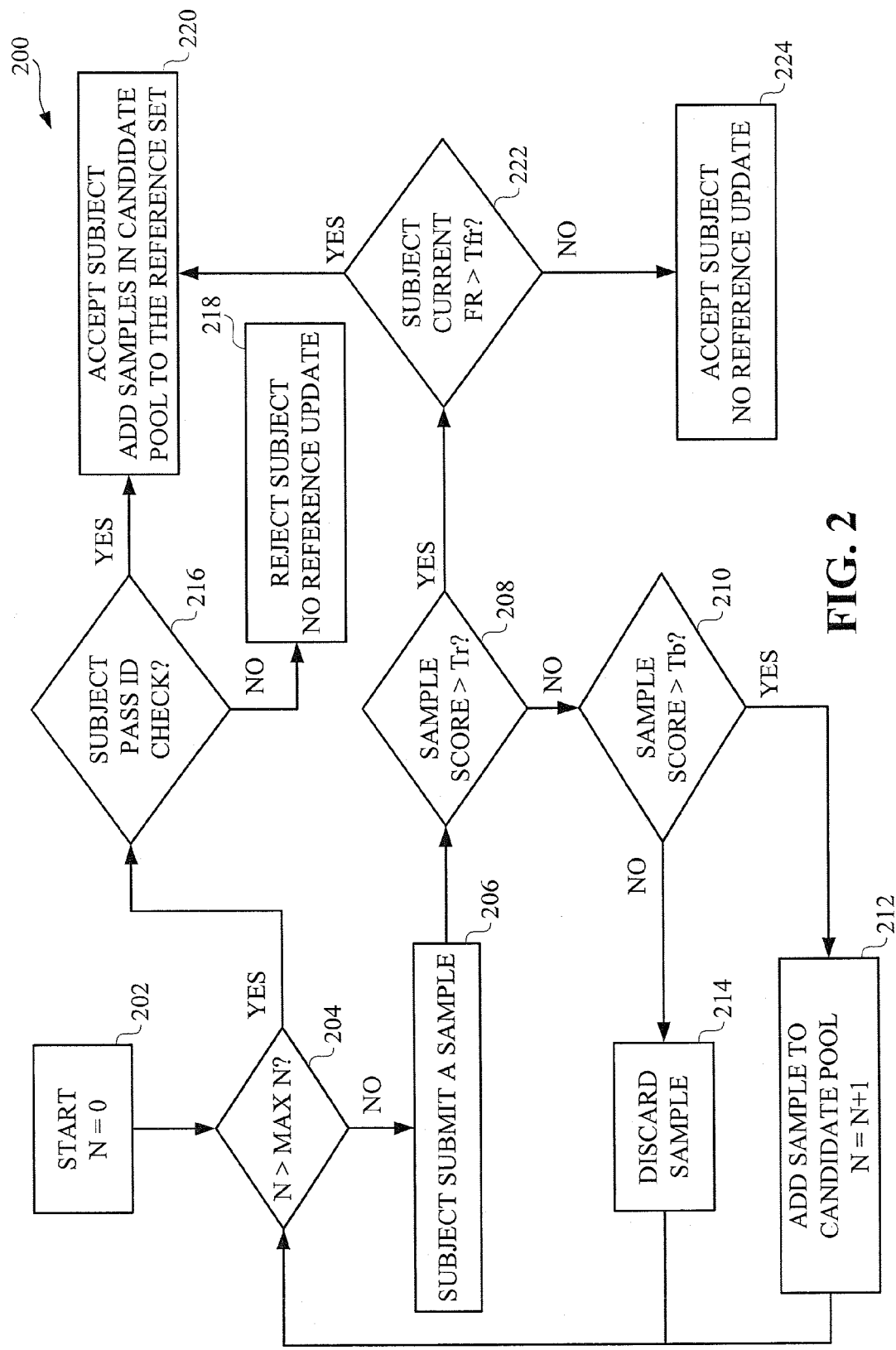
FIG. 2 is a flow diagram illustrating a signature verification methodology, according to an embodiment of the invention.

According the present invention, as shown in verification process 200 of FIG. 2, the procedure of collecting additional reference samples runs in the background in parallel to this regular sign-on procedure. It is to be understood that the term "subject" used in the context of FIG. 2 means "user."

As shown, variable N represents the number of signature sample submissions of the user (or trials). Initially, N is set to zero (step 204). MaxN represents the maximum number of trials permitted. The variable is checked after a sample submission (step 204) to determine if the maximum number of trials is reached.

The subject submits a signature sample in step 206. The sample is compared to the existing reference samples and a sample score is computed. The method for generating the sample score may be any known signature comparison and score generation process, e.g., based on distance metrics, etc. By way of example only, comparison and scoring methods disclosed in G. Russell et al., "Dynamic Signature Verification Using Discriminative Training," Proceedings of the 8th International Conference on Document Analysis and Recognition (ICDAR2005), Seoul, Korea, August 2005, or in A. Kholmatov et al., "Biometric Authentication Using Online Signatures," Lecture Notes in Computer Science ISCIS, October 2004, may be employed. The invention is not limited to any particular score generation process.

Whenever a submitted signature sample produces a score equal to or lower than the acceptance threshold Tr (a "no" in step 208), the score is compared to a lower threshold Tb, in step 210, and added to the candidate reference pool in step 212 if it is higher than Tb (a "yes" in step 210). Thus, Tr and Tb form a threshold value range. By way of example only, Tr may be 0.8 and Tb may be 0.3. Also, variable N is incremented in step 212.

A purpose of the threshold Tb is to root out outlier samples caused, for example, by hardware malfunction or a poor signature rendering. If the sample score is equal to or less than Tb, the sample is discarded in step 214. In this manner, the candidate reference pool accumulates in the background until the signer is either rejected or accepted.

If the signer is rejected via an ID comparison (wherein an ID entered by the user is compared to a previously stored ID known to be associated with the user) in step 216, then the subject is rejected and no reference set updating is performed (step 218).

If the signer failed all sign-on attempts but is accepted after a positive ID check, there are two implications: (1) the signer is indeed genuine; and (2) the samples collected in the candidate reference pool represent genuine diversions from the samples already stored in the system for this signer. Thus, in this case, all samples in the candidate reference pool are added to the reference set in step 220. Note that, in this case, there is no risk of adding forgeries because of the positive ID check. We call this form of updating a "type I" update.

If the signer succeeds in a sign-on attempt after one or more failures, the current false rejection (FR) rate for the subject is checked to determine whether the reference set should be updated. The FR rate for each subject can be determined by keeping counts of the number of rejected samples given by the subject and divide that by the total number of signatures provided by the subject, within a given period (e.g., the past year). This rate can be updated periodically, or after each successful authentication session, and saved as an attribute associated with the subject. In such case, only samples provided during successful authentication sessions (i.e., samples that are therefore considered to be genuine) are counted.

Since there is no ID check involved in this case, there is always a possibility that the system accepted the signer by mistake (false acceptance or FA), thus adding reference samples in this case is a more aggressive measure and needs to be handled with caution. This is why the FR rate of each account is evaluated periodically. By definition, the FR and FA rates tend to go in opposite directions: accounts with high FR tend to have low FA, and vise versa. Adding new samples into the reference set will likely reduce the FR rate of the system, while at the same time increase the risk of a higher FA rate.

Based on these observations, the following rule is applied in order to reduce the possibility of adding false samples into the reference set while at the same time allowing necessary updates. If the FR rate is very low (lower than a predetermined threshold Tfr, as compared in step 222 after a "yes" in step 208), then the subject is accepted and no reference update is performed (step 224). This is because there is no need to aggressively add new reference samples in this case. On the other hand, if the FR rate is higher than Tfr (a "yes" in step 222), then sample update is performed by adding all samples in the candidate reference pool to the reference set (step 220). This is because: (1) the high FR 25 rate indicates that the account is in greater need of sample update; and (2) the FA rate is likely low and thus the risk of adding false samples is low. We call this form of updating a "type II" update.

It is to be understood that the proper value for threshold Tfr depends on the application. In a retail application, where tolerance for FR is relatively low (for fear of offending customers) but tolerance for FA is relatively high (since the transaction amount is likely small), Tfr should be a low value such as 0.05. On the other hand, in a banking application where authenticated users can make fund transfers of large amounts and, thus, low FA is more important than low FR, Tfr should be a higher value such as 0.2.

This strategy is also able to capture the "drift" of a signer with a small delay (the length of the evaluation cycle). That is, when the drift is significant enough to cause substantially higher FR, type II updates will be performed which, along with type I updates, will quickly add more reference samples until FR falls below the threshold again.

It is also possible to identify the need to add new references to the enrollment because of drift by observing the evolution of the distribution of verified authentic signatures, either in the score space, or in the feature space. While a score is typically a single number used to compare against a threshold to determine whether to accept a signature, as described above, a score space is all possible values a score can take on. On the other hand, a feature is a multidimensional representation of the characteristics of a signature and, thus, a feature space is all possible values a feature can take on. Such an observation of the evolution of the distribution of verified authentic signatures would allow detection of drift before it is significant enough to cause more false rejects.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of adapting a signature verification system to variations in a signature of a user, comprising the steps of:
    obtaining one or more signature samples from the user, the one or more obtained signature samples being submitted by the user as part of a regular authentication procedure associated with the signature verification system; and
    updating a reference set of signature samples for the user through selection of one or more signature samples from the obtained signature samples, such that the updated reference set is usable by the signature verification system for verifying subsequent signature samples attributed to the user;

wherein the selection of the one or more signature samples used to update the reference set is conditioned on a false rejection rate of the user when at least one obtained signature sample of the user is authenticated and on an identification check when no obtained signature sample is authenticated; and further wherein the updating step is implemented as one or more software components loaded from a memory and executed by a processor.

2. The method of claim 1, wherein the reference set updating step further comprises adding at least one of the obtained signature samples to the reference set of signature samples for the user when a score associated with the obtained signature sample is not greater than a first threshold value but is greater than a second threshold value, and when the user passes the identification check.

3. The method of claim 2, wherein the user is accepted by the signature verification system when the user passes the identification check.

4. The method of claim 2, wherein the first threshold value and the second threshold value comprise a threshold value range, and wherein the first threshold value is greater than the second threshold value.

5. The method of claim 2, wherein the obtained signature sample is discarded when the score associated therewith is not greater than the second threshold value, regardless of the identification check.

6. The method of claim 1, wherein the reference set updating step further comprises adding at least one of the obtained signature samples to the reference set of signature samples for the user when the score associated with the obtained signature sample is greater than a first threshold value and when the false rejection rate associated with the user is greater than a false rejection threshold value.

7. The method of claim 6, wherein the user is accepted by the signature verification system but the reference set is not updated when the false rejection rate associated with the user is not greater than the false rejection threshold value.

8. The method of claim 1, wherein the updating step performed as part of a regular authentication procedure provides a mechanism for passively updating enrollment data of the user.

9. Apparatus for adapting a signature verification system to variations in a signature of a user, comprising:
   a memory; and
   a processor coupled to the memory and operative to: (i) obtain one or more signature samples from the user, the one or more obtained signature samples being submitted by the user as part of a regular authentication procedure associated with the signature verification system; and (ii) update a reference set of signature samples for the user through selection of one or more signature samples from the obtained signature samples, such that the updated reference set is usable by the signature verification system for verifying subsequent signature samples attributed to the user, wherein the selection of the one or more signature samples used to update the reference set is conditioned on a false rejection rate of the user when at least one obtained signature sample of the user is authenticated and on an identification check when no obtained signature sample is authenticated.

10. The apparatus of claim 9, wherein the reference set updating operation further comprises adding at least one of the obtained signature samples to the reference set of signature samples for the user when a score associated with the obtained signature sample is not greater than a first threshold value but is greater than a second threshold value, and when the user passes the identification check.

11. The apparatus of claim 10, wherein the user is accepted by the signature verification system when the user passes the identification check.

12. The apparatus of claim 10, wherein the first threshold value and the second threshold value comprise a threshold value range, and wherein the first threshold value is greater than the second threshold value.

13. The apparatus of claim 10, wherein the obtained signature sample is discarded when the score associated therewith is not greater than the second threshold value, regardless of the identification check.

14. The apparatus of claim 9, wherein the reference set updating operation further comprises adding at least one of the obtained signature samples to the reference set of signature samples for the user when the score associated with the obtained signature sample is greater than a first threshold value and when the false rejection rate associated with the user is greater than a false rejection threshold value.

15. The apparatus of claim 14, wherein the user is accepted by the signature verification system but the reference set is not updated when the false rejection rate associated with the user is not greater than the false rejection threshold value.

16. The apparatus of claim 9, wherein the updating operation performed as part of a regular authentication procedure provides a mechanism for passively updating enrollment data of the user.

17. An article of manufacture for adapting a signature verification system to variations in a signature of a user, comprising a machine readable storage medium containing one or more programs which when executed by a processor implement the steps of:
   obtaining one or more signature samples from the user, the one or more obtained signature samples being submitted by the user as part of a regular authentication procedure associated with the signature verification system; and
   updating a reference set of signature samples for the user through selection of one or more signature samples from the obtained signature samples, such that the updated reference set is usable by the signature verification system for verifying subsequent signature samples attributed to the user;
   wherein the selection of the one or more signature samples used to update the reference set is conditioned on a false rejection rate of the user when at least one obtained signature sample of the user is authenticated and on an identification check when no obtained signature sample is authenticated.

* * * * *